(12) United States Patent
Wong et al.

(10) Patent No.: US 8,116,284 B2
(45) Date of Patent: Feb. 14, 2012

(54) METHOD, DEVICE AND SYSTEM FOR TEMPORARILY SELECTING A TIMESLOT

(75) Inventors: Kin Wei Wong, Butterworth (MY); Hooi Hoon Ch'ng, Georgetown (MY); Lip Hoon Lim, Rawang (MY); Chun Yee Tan, Penang (MY)

(73) Assignee: Motorola Solutions, Inc., Schaumburg, IL (US)

( * ) Notice: Subject to any disclaimer, the term of this patent is extended or adjusted under 35 U.S.C. 154(b) by 554 days.

(21) Appl. No.: 12/338,303

(22) Filed: Dec. 18, 2008

(65) Prior Publication Data

US 2010/0157958 A1 Jun. 24, 2010

(51) Int. Cl.
*H04B 7/212* (2006.01)
*H04B 7/00* (2006.01)

(52) U.S. Cl. ........ 370/337; 370/342; 370/312; 455/509; 455/519

(58) Field of Classification Search .................. 370/328, 370/329–330, 337, 312, 432, 346–347; 455/509, 455/518–519
See application file for complete search history.

(56) References Cited

U.S. PATENT DOCUMENTS

| | | | | |
|---|---|---|---|---|
| 5,235,631 A * | 8/1993 | Grube et al. | | 455/509 |
| 5,548,802 A * | 8/1996 | Barnes et al. | | 455/15 |
| 5,930,295 A * | 7/1999 | Isley et al. | | 375/219 |
| 6,252,859 B1 * | 6/2001 | Rhodes et al. | | 370/329 |
| 6,411,816 B1 * | 6/2002 | McDonald et al. | | 455/518 |
| 6,804,529 B1 * | 10/2004 | Barnes et al. | | 455/515 |
| 6,819,661 B2 * | 11/2004 | Okajima et al. | | 370/347 |
| 6,958,986 B2 * | 10/2005 | Cain | | 370/337 |
| 7,423,992 B2 * | 9/2008 | Iwamura | | 370/330 |
| 7,483,407 B2 * | 1/2009 | McDonald et al. | | 370/330 |
| 2004/0032847 A1 * | 2/2004 | Cain | | 370/338 |
| 2006/0014555 A1 * | 1/2006 | Paszkat | | 455/518 |
| 2006/0018292 A1 * | 1/2006 | Wiatrowski et al. | | 370/337 |
| 2006/0154682 A1 * | 7/2006 | Shim | | 455/518 |

* cited by examiner

*Primary Examiner* — Kwang B Yao
*Assistant Examiner* — Candal Elpenord
(74) *Attorney, Agent, or Firm* — Terri Hughes Smith; Anthony P. Curtis; Daniel R. Bestor

(57) ABSTRACT

Temporarily selecting a TDMA timeslot by a radio communication device to thereby allow the radio communication device to communicate, through at least one repeater station, with a talkgroup of other radio communication devices is disclosed. The radio communication device has an assigned default timeslot for communicating with the talkgroup. The radio communication device determines if the default timeslot is available for the radio communication device to communicate with the talkgroup and searches for an available timeslot, when the default timeslot is unavailable. The radio communication device temporarily selects the available timeslot as a temporary selected group timeslot for the talkgroup.

19 Claims, 3 Drawing Sheets

METHOD, DEVICE AND SYSTEM FOR
TEMPORARILY SELECTING A TIMESLOT

FIELD OF THE INVENTION

The present invention relates generally to talkgroup timeslot selection methods, communication devices and wireless communication systems that employs a time division multiple access (TDMA) signaling protocol.

BACKGROUND OF THE INVENTION

Trunked radio frequency (RF) or wireless communication systems for radio communication devices are well known in the art. Typically in such systems, a plurality of radio communication devices (e.g. two-way radios) share a limited number of communication resources, e.g. one or more repeater stations and communication channels. Wireless communication systems employing TDMA signaling are well known. These systems divide a RF resource into a series of recurring time frames which are further divided into timeslots and can be shared by communication devices or talkgroups of such radio communication devices. These timeslots, occurring periodically in time frames, constitute the communication channels (timeslots) of interest.

In one approach to sharing timeslots or channels, the timeslots or channels are typically assigned to requesting radio communication devices by a communication resource controller coupled to the repeater stations, which requests and assignments are exchanged via a common control channel. The controller might assign a timeslot to a radio communication device for a single transmission such that, at the end of the radio communication device's transmission, the timeslot (channel) is re-assigned to another radio communication device (i.e. so-called transmission trunking).

In one alternative approach, the controller might assign a timeslot (channel) to a group of radio communication devices for engaging in a conversation, and keep the timeslot (channel) assigned to the group until completion of, or a substantial pause in, the conversation. That is, the assigned timeslot (channel) is not made available for re-assignment until the end of the conversation is anticipated. A conversation may include multiple transmissions from multiple radio communication devices in a talkgroup and is referred to in the art as a message. Accordingly, this form of timeslot (channel) assignment is referred to as message trunking.

The above known timeslot (channel) assignment approaches require a common controller (system level controller) to monitor timeslots (channels) and determine when to assign, maintain assignment, deassign and reassign timeslots (channels) to a talkgroup or a radio communication device. Thus, known timeslot (channel) assignment approaches use common or system level controllers and can cause communication delays and may be an unnecessary or undesirable overhead for wireless communication systems.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
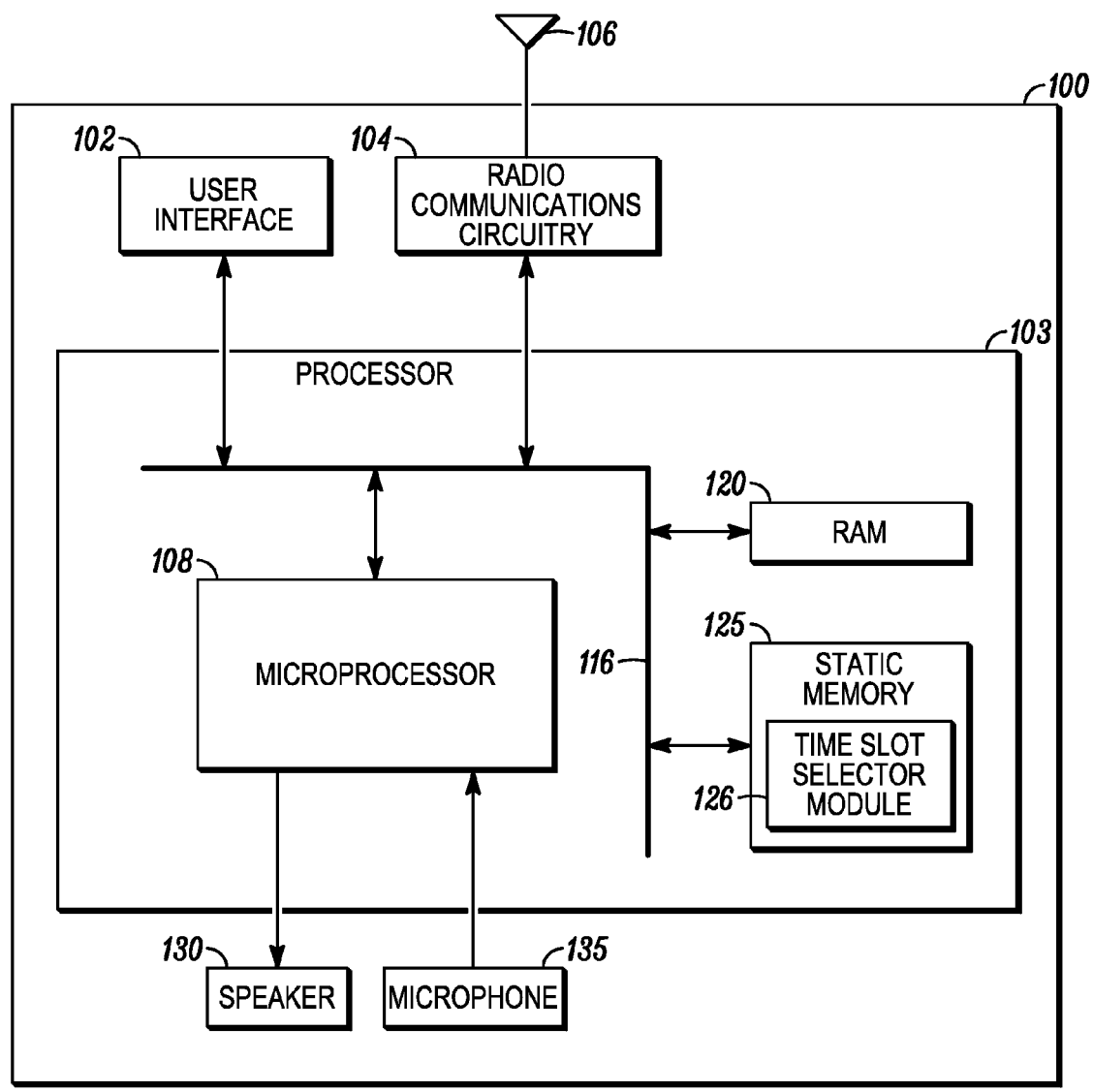
FIG. 1 is a schematic diagram illustrating a radio communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in method steps, device components and system components. Accordingly, the method steps, device components and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as first and second, top and bottom, and the like, may be used solely to distinguish one entity or action from another entity or action without necessarily requiring or implying any actual such relationship or order between such entities or actions. The terms "comprises," "comprising," "including," or any other variation thereof, are intended to cover a non-exclusive inclusion, such that method steps, device components and system components that comprises a list of steps or elements does not include only those steps or elements but may include other elements not expressly listed or inherent to such method steps, device components and system components. An element proceeded by "comprises . . . a" does not, without more constraints, preclude the existence of additional identical elements in the device or system that comprises the element.

According to one aspect of the disclosure, there is provided a method for temporarily selecting a TDMA timeslot by a radio communication device to allow the radio communication device to communicate, through at least one repeater station, with a talkgroup of other radio communication devices. The radio communication device has an assigned default timeslot for communicating with the talkgroup and the method is performed by the radio communication device. The method comprises determining if the default timeslot is available for the radio communication device to communicate with the talkgroup and searching for an available timeslot, when the default timeslot is unavailable. The method then performs temporarily selecting the available timeslot as a temporary selected group timeslot for the talkgroup.

According to another aspect of the disclosure, there is provided a radio communication device having an assigned default timeslot for communicating with a talkgroup of other radio communication devices. The radio communication device comprises radio communication circuitry and a processor coupled to the radio communication circuitry. In operation, the processor determines, from a signal provided by the radio communication circuitry, if the default timeslot is available for the radio communication device to communicate with the talkgroup. When the default timeslot is unavailable, the processor instructs the radio communication circuitry to search for an available timeslot and temporarily select the available timeslot as a temporary selected group timeslot for the talkgroup.

According to another aspect of the disclosure, there is provided a wireless communication system comprising a plurality of radio communication devices forming a talkgroup and at least one repeater station through which the radio communication devices communicate. Each of the radio communication devices have a common assigned default timeslot for communicating with the talkgroup and wherein each one of the radio communication devices determines if the default timeslot is available to communicate with the talkgroup. When the default timeslot is unavailable, each of the communication devices concurrently searches for an available timeslot and temporarily selects the available timeslot as a temporary selected group timeslot for the talkgroup.

Referring to FIG. 1, there is illustrated a simplified schematic block diagram of a radio communication device in the form of a two-way radio 100 in accordance with an embodiment of the present invention. The two-way radio 100 includes a user interface 102 operatively coupled to a processor 103 by a data and address bus 116. The user interface 102 typically includes a display screen, tuning and volume controls and talkgroup channel selection buttons that may form part of a keypad.

The two-way radio 100 also has radio communication circuitry 104 operatively coupled to an antenna 106 through an antenna port. The radio communication circuitry 104 is operatively coupled to the processor 103 by the data and address bus 116. The radio communication circuitry 104 includes a RF amplifier, modulation and demodulation circuitry, frequency synthesis circuitry, filtering circuitry and other typical RF circuitry as will be apparent to a person skilled in the art.

The processor 103 comprises a microprocessor 108 operatively coupled by the data and address bus 116 to both a random access memory (RAM) 120 and a static memory 125. The microprocessor 103 has ports coupled to a speaker 130 and a microphone 135, and the static memory 125 includes a timeslot selector module 126 that has code stored for performing a method for temporarily selecting a TDMA timeslot described below.

Figure 2:
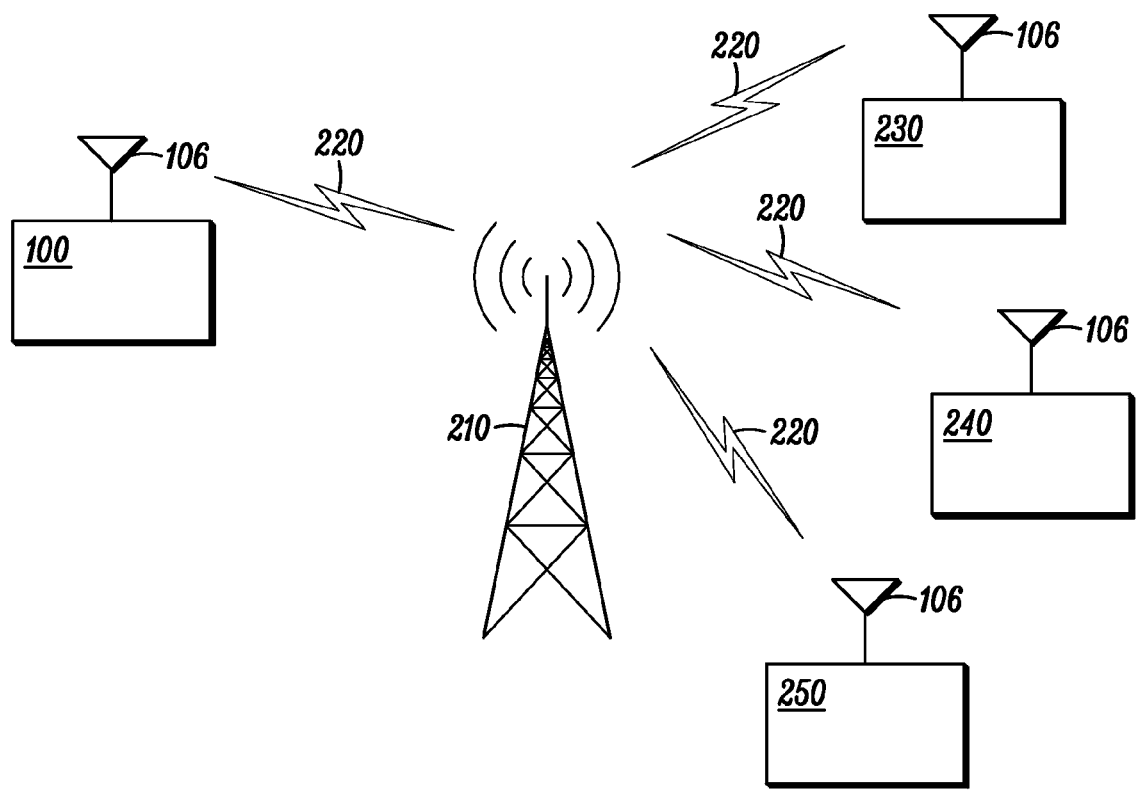
FIG. 2 illustrates a TDMA wireless communication system comprising a plurality of radio communication devices of FIG. 1.

Referring to FIG. 2, there is illustrated a TDMA wireless communication system 200 comprising a plurality of radio communication devices in the form of the two-way radio 100 plus other identical or similar two-way radios 230, 240, 250. The two-way radios 100, 230, 240, 250 shown are in a talkgroup and communicate with each other through a repeater station 210 via a traffic channel provided by radio links 220. Other talkgroups may also be in the TDMA wireless communication system 200 and communicate with each other using the repeater station 210 in the traffic channel that consists of two or more TDMA traffic channel slots as well as a Common Announcement CHannel (CACH) for channel numbering, and channel access. This CACH is transmitted continuously in a frame structure without any gaps as long as the base station 210 is active and fault free.

Although for simplicity the illustration of FIG. 2 shows only one repeater station 210, more than one repeater station 210 may be included in the communication system 200. As will be apparent to a person skilled in the art, when more than one repeater station 210 is used, a greater coverage area can be provided for the talkgroup.

Figure 3:
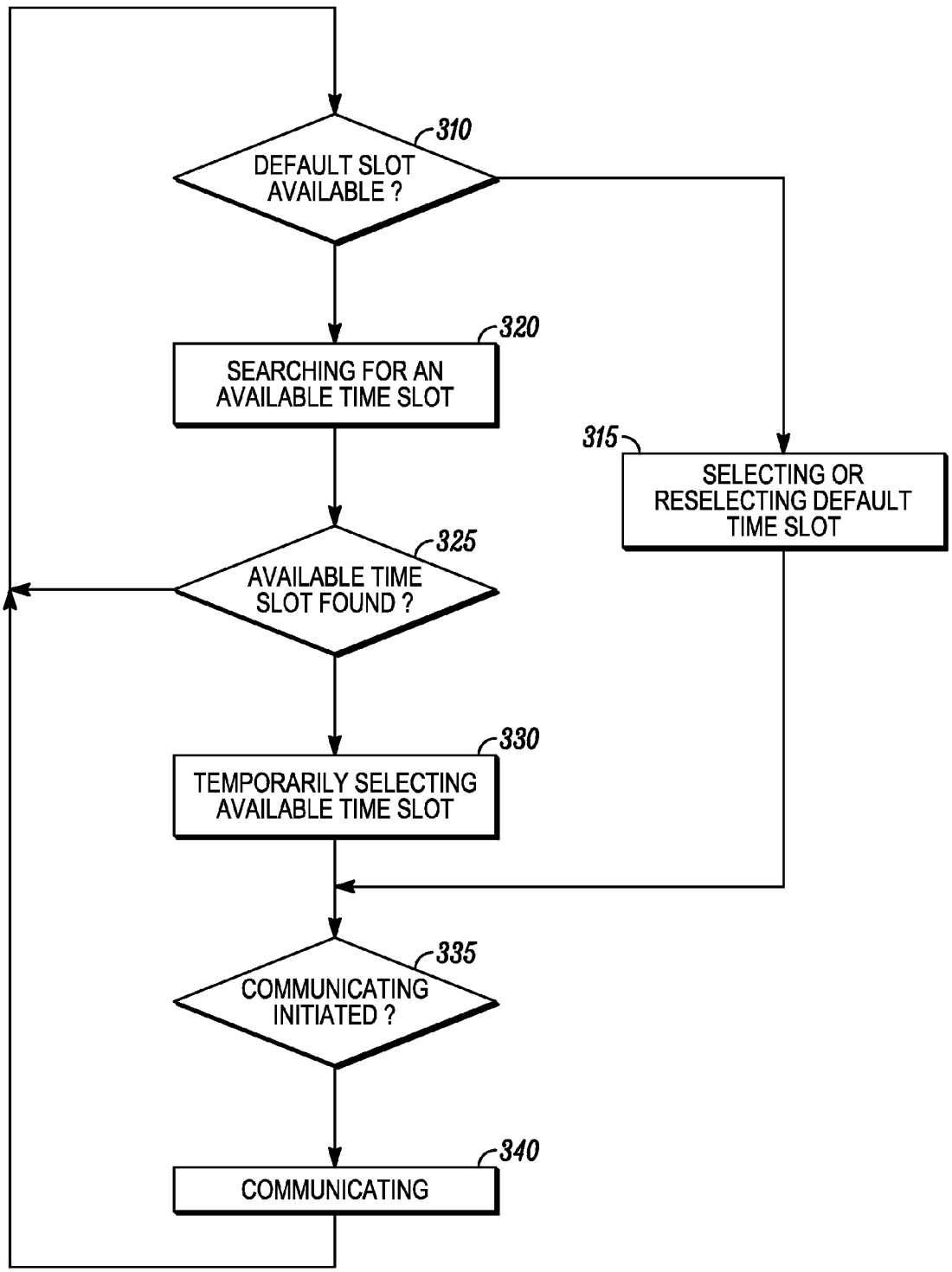
FIG. 3 is a flow diagram illustrating a method performed by the radio communication device of FIG. 1 for temporarily selecting a TDMA timeslot.

Referring to FIG. 3, there is illustrated a flow diagram illustrating a method 300 for temporarily selecting a TDMA timeslot by a radio communication device, such as the two-way radio 100, to communicate, through at least one repeater station 210 with a talkgroup of other radio communication devices 230, 240, 250. In this regard, the radio communication device 100 has an assigned default timeslot for communicating with the talkgroup, and the method 300 is performed by the radio communication device 100, specifically the radio communication circuitry 104 and the processor 103 comprising the timeslot selector module 126. As will be apparent to a person skilled in the art, all the radio communication devices 100, 230, 240, 250 in the talkgroup perform the method 300 substantially synchronously or at least concurrently. The radio communication device determines if the default timeslot is available to communicate with the talkgroup at step 310. Step 310 is performed by processing information sent from the repeater station 210 provided in the traffic channel.

If the default timeslot is unavailable, the radio communication device searches for an available timeslot by processing information sent from the repeater station 210 provided in the traffic channel, and more specifically, the CACH, at step 320. For instance, in one embodiment, the TDMA wireless communication system 200 may only allocate two slots (slot 1 and slot 2) in the traffic channel in which slot 1 is the default slot. Since slot 1 has been determined as being unavailable, the only possible available slot is slot 2. If the CACH identifies slot 2 as unavailable, and thus, the radio communication device determines that an available timeslot cannot be found at step 325, the method 300 returns back to step 310 and the process flow repeats. If, however, the CACH identifies slot 2 as available, the radio communication device determines that an available timeslot is found at step 325, and the radio communication device temporarily selects the available timeslot as a temporary selected group timeslot for the talkgroup at step 330.

If communication is initiated by any member of the talkgroup at step 335, then the radio communication device 100 transmits or receives the communication using the temporary selected group timeslot, which in this case is slot 2, at step 340. While the communication is in process, slot 2 is identified by the CACH as unavailable to any other talkgroup in the TDMA wireless communication system 200. If no communication has been initiated at step 335, or upon completion of the communication at step 340, the method 300 returns back to step 310 and the process flow repeats.

Referring back to step 310, if the radio communication device determines that the default timeslot (slot 1) is available for the radio communication device to communicate with the talkgroup, the radio communication device selects or re-selects the default timeslot at step 315. The radio communication device transmits or receives a communication on the default timeslot, if communication is initiated, at step 335. If no communication is initiated at step 335, or upon completion of the communication at step 340, the method 300 returns back to step 310 and the process flow repeats.

In the above description of the method 300, the temporary selected group timeslot is one of only two available timeslots in which slot 1 is the default slot and slot 2 is the only slot to be searched and determined if it is available for the talkgroup. However, if the TDMA wireless communication system 200 can allocate more than two slots, for instance five slots then the step of searching for an available timeslot at step 320 may be performed in a pre-defined slot order, and the first available timeslot that is encountered during the search is the timeslot that is temporarily selected by the radio communication device. For example, if timeslot 1 is the default timeslot, then the radio communication devices can incrementally search the timeslots for an available timeslot to temporarily select as the group timeslot for the talkgroup (e.g. first searching timeslot 2, then timeslot 3, then timeslot 4, and finally timeslot 5). Other predefined slot order searches are also envisaged, such as decrementally searching the timeslots for an available timeslot to temporarily select as the group timeslot for the talkgroup (e.g. first searching timeslot 5, then timeslot 4, then timeslot 3, and finally timeslot 2).

From the forgoing it will be apparent that the radio communication device 100 has an assigned default timeslot for communicating with a talkgroup of the other radio communication devices 230, 240, 250 in the talkgroup. In operation the processor 103 determines, from a signal provided by the radio communication circuitry 104, if the default timeslot is available for the radio communication device 100 to communicate with the talkgroup. When the default timeslot is unavailable, the processor 103 instructs the radio communication circuitry 104 to search for an available timeslot and temporarily select the available timeslot as a temporary selected group timeslot for the talkgroup. The signal provided by the radio communication circuitry is generated from information sent from a repeater station 210, more specifically the CACH.

At the system level, comprising the wireless communication system 200, the radio communication devices 100, 230, 240, 250 have a common assigned default timeslot for communicating with the talkgroup. Each one of the radio communication devices 100, 230, 240, 250 determines concurrently if the default timeslot is available to communicate with the talkgroup. When the default timeslot is unavailable, each of the communication devices 100, 230, 240, 250 concurrently searches for an available timeslot and temporarily selects the available timeslot as a temporary selected group timeslot for the talkgroup.

Advantageously, the present invention alleviates the need for timeslot (channel) assignment by common or system level controllers since each radio communication device in a talkgroup determines individually, but concurrently, which timeslot to select.

It will be appreciated that the embodiment of the present invention described herein may be comprised of one or more conventional processors and unique stored program instructions that control the one or more processors to implement, in conjunction with certain non-processor circuits, some, most, or all of the functions the circuit as described herein. The non-processor circuits may include, but are not limited to, a radio receiver, a radio transmitter, signal drivers, clock circuits, power source circuits, and user input devices. Alternatively, some or all functions could be implemented by a state machine that has no stored program instructions, or in one or more application specific integrated circuits (ASICs), in which each function or some combinations of certain functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for temporarily selecting a time division multiple access (TDMA) timeslot by a radio communication device to thereby allow the radio communication device to communicate, through at least one repeater station, with a talkgroup of other radio communication devices, the method comprising:
the radio communication device having an assigned default timeslot for communicating with the talkgroup;
the radio communication device determining if the default timeslot is available for the radio communication device to communicate with the talkgroup;
the radio communication device searching for an available timeslot when the default timeslot is unavailable;
the radio communication device temporarily selecting the available timeslot as a temporary selected group timeslot for the talkgroup; and
the radio communication device re-selecting the default timeslot for communicating with the talkgroup when the default timeslot becomes available.

2. The method, as claimed in claim 1, wherein the radio communication device temporarily selecting the available timeslot further comprises the subsequent step of communicating with the talkgroup using the temporary group timeslot.

3. The method, as claimed in claim 1, wherein the searching is performed in a predefined slot order.

4. The method, as claimed in claim 1, wherein the temporary selected group timeslot is one of only two available timeslots.

5. The method, as claimed in claim 1, wherein the determining is performed by processing information sent from the repeater station.

6. The method, as claimed in claim 5, wherein the information sent from the repeater station is provided in a common announcement channel sent from the repeater station.

7. The method, as claimed in claim 1, wherein the searching is performed by processing information sent from the repeater station.

8. The method, as claimed in claim 7, wherein the information sent from the repeater station is provided in a common announcement channel sent from the repeater station.

9. A radio communication device having an assigned default timeslot for communicating with a talkgroup of other radio communication devices, the radio communication device comprising:
radio communication circuitry; and
a processor coupled to the radio communication circuitry, wherein in operation the processor:

determines, from a signal provided by the radio communication circuitry, if the default timeslot is available for the radio communication device to communicate with the talkgroup, when the default timeslot is unavailable the processor instructs the radio communication circuitry to search for an available timeslot and temporarily select the available timeslot as a temporary selected group timeslot for the talkgroup, and when the default timeslot becomes available the processor instructs the radio communication circuitry to re-select the default timeslot for communicating with the talkgroup.

10. A radio communication device, as claimed in claim 9, wherein radio communication circuitry performs communicating with the talkgroup using the temporary group timeslot.

11. The radio communication device, as claimed in claim 9, wherein the search for an available timeslot is performed in a predefined slot order.

12. The radio communication device, as claimed in claim 9, wherein the temporary selected group timeslot is one of only two available timeslots.

13. The radio communication device, as claimed in claim 9, wherein the signal provided by the radio communication circuitry is generated from information sent from a repeater station.

14. The radio communication device, as claimed in claim 13, wherein the information sent from the repeater station is provided in a common announcement channel.

15. A wireless communication system comprising:
a plurality of radio communication devices forming a talkgroup; and
at least one repeater station through which the radio communication devices communicate, wherein each of the radio communication devices have a common assigned default timeslot for communicating with the talkgroup, and wherein each one of the radio communication devices:

determines if the default timeslot is available to communicate with the talkgroup, when the default timeslot is unavailable each of the radio communication devices searches for an available timeslot and temporarily selects the available timeslot as a temporary selected group timeslot for the talkgroup, and when the default timeslot becomes available each of the radio communication devices re-select the default timeslot for communicating with the talkgroup.

16. The wireless communication system, as claimed in claim 15, wherein each of the radio communication devices communicate with the talkgroup using the temporary group timeslot.

17. The wireless communication system, as claimed in claim 15, wherein each of the radio communication devices concurrently searches for an available timeslot in a predefined slot order.

18. The wireless communication system, as claimed in claim 15, wherein the temporary selected group timeslot is one of only two available timeslots.

19. The wireless communication system, as claimed in claim 15, wherein each one of the radio communication devices determines if the default timeslot is available from information sent from a repeater station.

* * * * *

UNITED STATES PATENT AND TRADEMARK OFFICE
CERTIFICATE OF CORRECTION

PATENT NO. : 8,116,284 B2  
APPLICATION NO. : 12/338303  
DATED : February 14, 2012  
INVENTOR(S) : Wong et al.

Page 1 of 1

It is certified that error appears in the above-identified patent and that said Letters Patent is hereby corrected as shown below:

In Column 7, Line 15, in Claim 10, delete "A" and insert -- The --, therefor.

Signed and Sealed this
Eighteenth Day of December, 2012

David J. Kappos
*Director of the United States Patent and Trademark Office*